(12) United States Patent
Iida

(10) Patent No.: US 10,409,422 B2
(45) Date of Patent: Sep. 10, 2019

(54) ELECTRONIC APPARATUS, CONTROLLER, RECORDING MEDIUM, AND METHOD OF OPERATING ELECTRONIC APPARATUS

(71) Applicant: KYOCERA CORPORATION, Kyoto (JP)

(72) Inventor: Koji Iida, Katsuragi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/683,665

(22) Filed: Aug. 22, 2017

(65) Prior Publication Data

US 2018/0059872 A1 Mar. 1, 2018

(30) Foreign Application Priority Data

Aug. 24, 2016 (JP) ................................ 2016-163518

(51) Int. Cl.
| | | |
|---|---|---|
| *G06F 1/16* | (2006.01) | |
| *G06F 3/041* | (2006.01) | |
| *G06F 3/044* | (2006.01) | |
| *G06F 3/0488* | (2013.01) | |

(52) U.S. Cl.
CPC .......... *G06F 3/0418* (2013.01); *G06F 1/1626* (2013.01); *G06F 1/1643* (2013.01); *G06F 1/1684* (2013.01); *G06F 1/1686* (2013.01); *G06F 3/044* (2013.01); *G06F 3/04883* (2013.01); *G06F 2200/1637* (2013.01); *H04M 2250/22* (2013.01); *H04M 2250/52* (2013.01)

(58) Field of Classification Search
CPC ................................ G06F 3/0418; G06F 3/044
See application file for complete search history.

(56) References Cited

U.S. PATENT DOCUMENTS

| | | | | |
|---|---|---|---|---|
| 6,094,197 A | * | 7/2000 | Buxton | ................. G06F 3/0482 341/22 |
| 8,941,611 B2 | | 1/2015 | Koda | |
| 9,971,500 B2 | * | 5/2018 | Yang | ..................... G06F 3/0482 |
| 2012/0249470 A1 | * | 10/2012 | Sugiura | ................. G06F 1/1643 345/174 |

FOREIGN PATENT DOCUMENTS

| | | |
|---|---|---|
| JP | 2011-204127 A | 10/2011 |
| JP | 2012-216053 A | 11/2012 |
| JP | 2013-235443 A | 11/2013 |
| JP | 2014-81666 A | 5/2014 |

* cited by examiner

*Primary Examiner* — Charles V Hicks
(74) *Attorney, Agent, or Firm* — Duane Morris LLP

(57) ABSTRACT

An electronic apparatus includes a touch panel and a processor. The touch panel detects an operation performed on a surface of the electronic apparatus. The processor determines whether or not a first operation, in which a first movement amount of an operation point on the surface of the electronic apparatus in a first direction is equal to or larger than a first threshold value, has been performed based on an output signal from the touch panel. The processor executes a processing in accordance with the first operation when determining that the first operation has been performed. The processor invalidates the first operation when a second movement amount of the operation point in a second direction, which is different from the first direction, becomes equal to or larger than a second threshold value before determining that the first operation has been performed.

6 Claims, 12 Drawing Sheets

F I G . 7
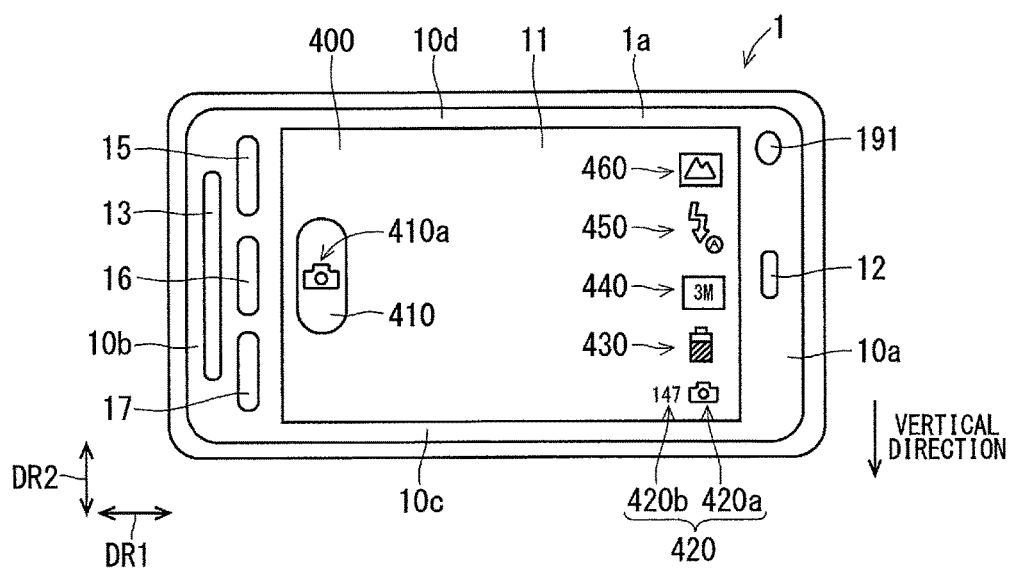

F I G . 9
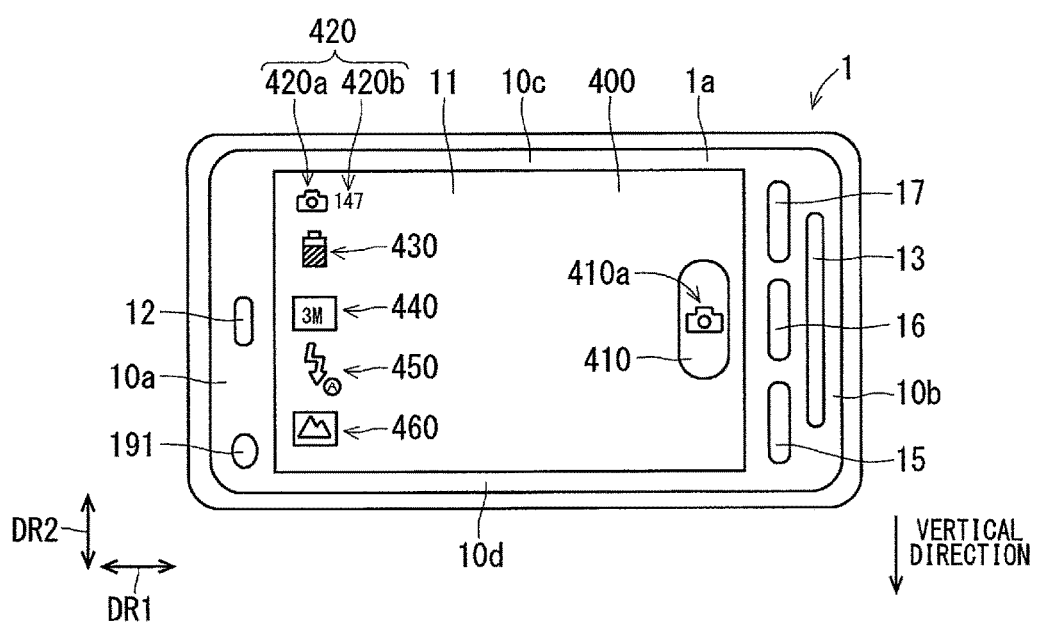

F I G . 1 0
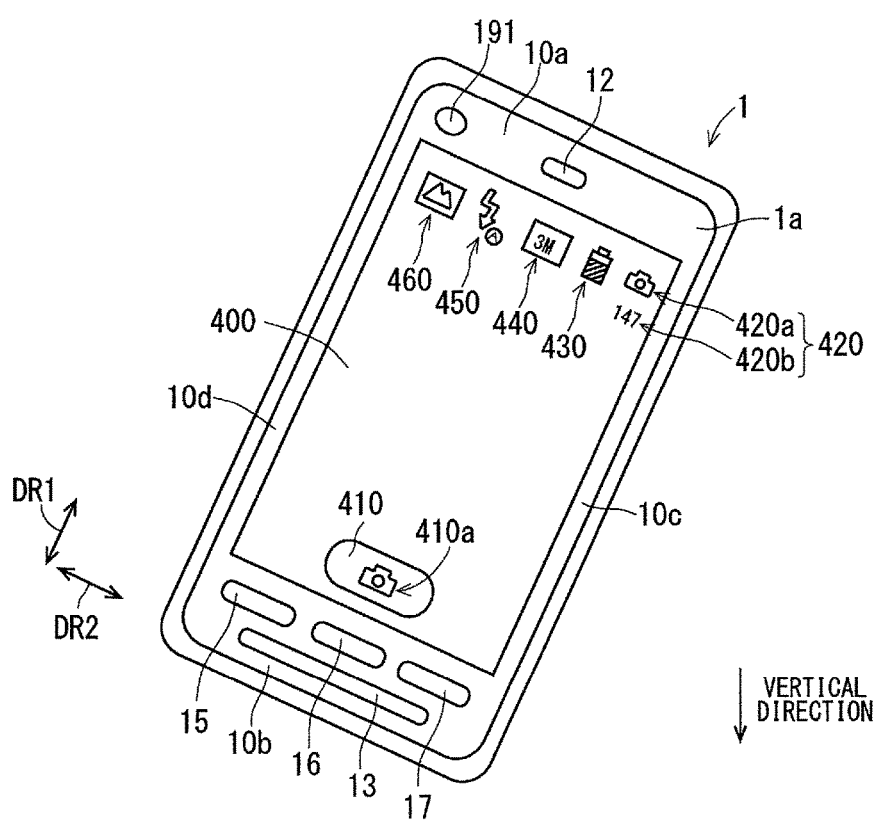

ELECTRONIC APPARATUS, CONTROLLER, RECORDING MEDIUM, AND METHOD OF OPERATING ELECTRONIC APPARATUS

CROSS-REFERENCE TO RELATED APPLICATION

The present application claims priority under 35 U.S.C. § 119 to Japanese Patent Application No. 2016-163518, filed on Aug. 24, 2016, entitled "ELECTRONIC APPARATUS, CONTROLLER, CONTROL PROGRAM, AND METHOD OF OPERATING ELECTRONIC APPARATUS". The content of which is incorporated by reference herein in its entirety.

FIELD

Embodiments of the present disclosure relate to an electronic apparatus.

BACKGROUND

Various techniques are suggested regarding electronic apparatuses.

SUMMARY

An electronic apparatus, a control device, a recording medium, and a method of operating the electronic apparatus are disclosed. In one embodiment, electronic apparatus includes a touch panel and at least one processor. The touch panel detects an operation performed on a surface of the electronic apparatus. The at least one processor determines whether or not a first operation, in which a first movement amount of an operation point on the surface in a first direction is equal to or larger than a first threshold value, has been performed based on an output signal from the touch panel. The at least one processor executes a processing in accordance with the first operation when determining that the first operation has been performed. The at least one processor invalidates the first operation when a second movement amount of the operation point in a second direction, which is different from the first direction, becomes equal to or larger than a second threshold value before determining that the first operation has been performed.

In one embodiment, a controller controls an operation of an electronic apparatus. The electronic apparatus includes a touch panel. The touch panel detects an operation performed on a surface of the electronic apparatus. The controller includes at least one processor. The at least one processor determines whether or not a first operation, in which a first movement amount of an operation point on the surface in a first direction is equal to or larger than a first threshold value, has been performed based on an output signal from the touch panel. The at least one processor executes a processing in accordance with the first operation when determining that the first operation has been performed. The at least one processor invalidates the first operation when a second movement amount of the operation point in a second direction, which is different from the first direction, becomes equal to or larger than a second threshold value before determining that the first operation has been performed.

In one embodiment, a non-transitory computer-readable recording medium stores a control program for controlling an electronic apparatus. The electronic apparatus includes a touch panel. The touch panel detects an operation performed on a surface of the electronic apparatus. The control program causes the electronic apparatus to determine whether or not a first operation, in which a first movement amount of an operation point on the surface in a first direction is equal to or larger than a first threshold value, has been performed based on an output signal from the touch panel. The control program causes the electronic apparatus to execute a processing in accordance with the first operation when determining that the first operation has been performed. The control program causes the electronic apparatus to invalidate the first operation when a second movement amount of the operation point in a second direction, which is different from the first direction, becomes equal to or larger than a second threshold value before determining that the first operation has been performed.

In one embodiment, a method of operating an electronic apparatus that includes a touch panel configured to detect an operation performed on a surface of the electronic. The method comprises determining whether or not a first operation, in which a first movement amount of an operation point on the surface in a first direction is equal to or larger than a first threshold value, has been performed based on an output signal from the touch panel. The method comprises executing a processing in accordance with the first operation when determining that the first operation has been performed. The method comprises invalidating the first operation when a second movement amount of the operation point in a second direction, which is different from the first direction, becomes equal to or larger than a second threshold value before determining that the first operation has been performed.

BRIEF DESCRIPTION OF THE DRAWINGS

FIG. 7 illustrates an example of a display of the electronic apparatus.

FIG. 9 illustrates an example of a display of the electronic apparatus.

FIG. 10 illustrates an example of a display of the electronic apparatus.

DETAILED DESCRIPTION

<External Appearance of Electronic Apparatus>

Figure 1:
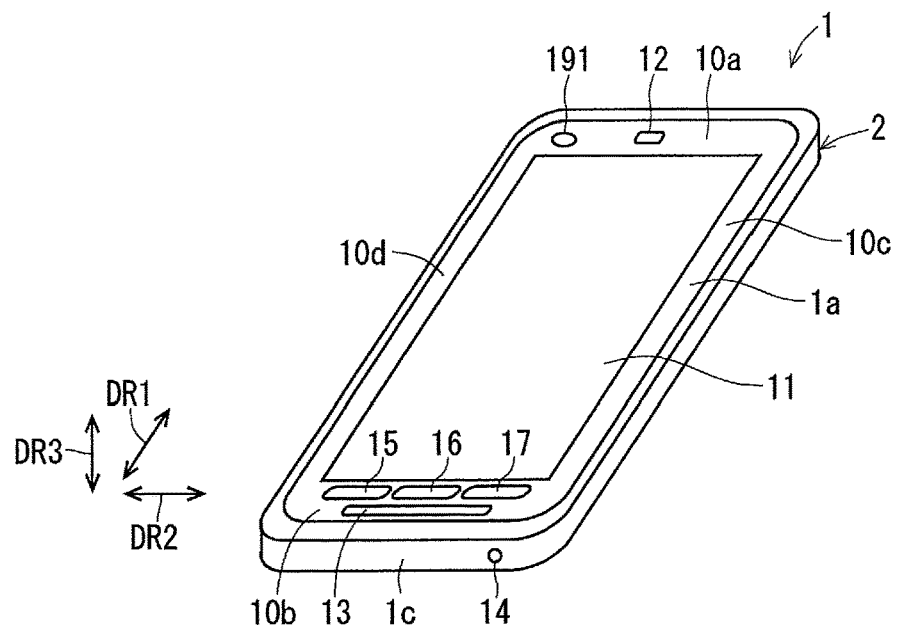
FIG. 1 illustrates a perspective view showing an example of an external appearance of an electronic apparatus.
Figure 2:
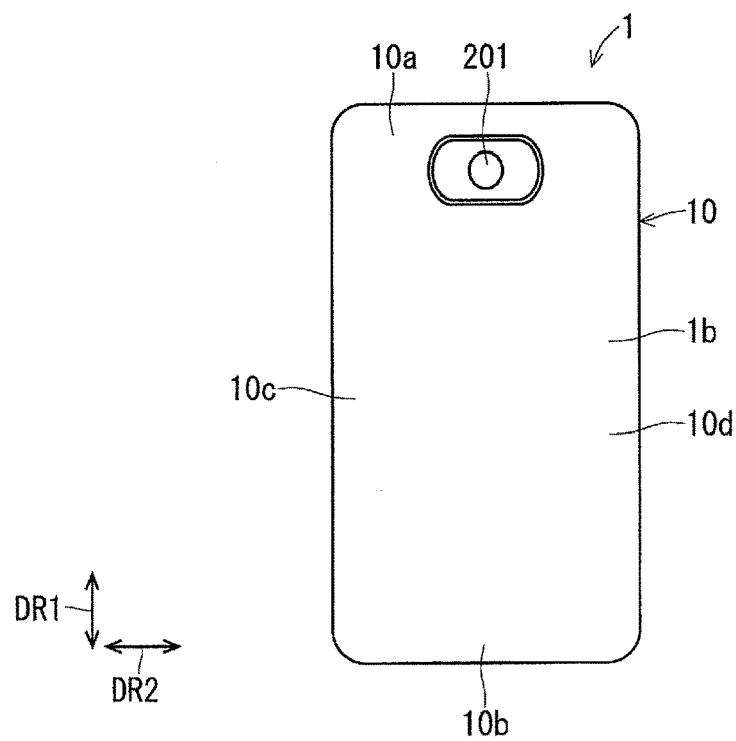
FIG. 2 illustrates a rear view showing an example of the external appearance of the electronic apparatus.

FIGS. 1 and 2 illustrate a perspective view and a rear view showing an example of an external appearance of an electronic apparatus 1, respectively. The electronic apparatus 1 is a mobile phone such as a smartphone, for example. As shown in FIG. 1 and FIG. 2, the electronic apparatus 1 includes an apparatus case 2 having a plate shape substantially rectangular in a plan view. The apparatus case 2 constitutes an outer package of the electronic apparatus 1. FIGS. 1 and 2 illustrate a longitudinal direction DR1, a short-length direction DR2, and a thickness direction DR3 of the electronic apparatus 1.

A display region 11, in which various types of information such as characters, symbols, and diagrams are displayed, is located in a front surface 1a of the electronic apparatus 1, that is to say, a front surface of the apparatus case 2. A touch panel 140, which will be described below, is located in a rear surface side of the display region 11. Accordingly, a user can input various types of information to the electronic apparatus 1 by operating the display region 11 in the front surface 1a of the electronic apparatus 1 with his/her finger, for example. The user can also input the various types of information to the electronic apparatus 1 by operating the display region 11 with a pen for the touch panel such as a stylus pen, for example, instead of the operator such as his/her finger.

A receiver hole 12 is located in one end (an upper end in FIG. 1) of the front surface 1a of the electronic apparatus 1 (the front surface of the apparatus case 2) in the longitudinal direction DR1. A speaker hole 13 is located in the other end (a lower end in FIG. 1) of the front surface 1a of the electronic apparatus 1 in the longitudinal direction DR1. A microphone hole 14 is located in a side surface 1c in a side of the speaker hole 13 of the electronic apparatus 1 (the lower side surface 1c in FIG. 1).

A lens 191 included in a first camera 190, which will be described below, can be visually recognized from the one end of the front surface 1a of the electronic apparatus 1 in the longitudinal direction DR1. As shown in FIG. 2, a lens 201 included in a second camera 200, which will be described below, can be visually recognized from one end of a rear surface 1b of the electronic apparatus 1 in the longitudinal direction DR1.

The electronic apparatus 1 includes an operation button group 18 including a plurality of operation buttons (refer to FIG. 3 described below). Each operation button is a hardware button. Specifically, each of the plurality of operation buttons is a press button. The operation button group 18 includes operation buttons 15, 16, and 17 located in the other end of the front surface 1a of the electronic apparatus 1 in the longitudinal direction DR1.

The operation button 15 is a back button, for example. The back button is an operation button to switch a display in the display region 11 to a preceding one. The user operates the operation button 15, thereby switching the display in the display region 11 to the preceding one.

The operation button 16 is a home button, for example. The home button is an operation button to display a home screen in the display region 11. The user operates the operation button 16, thereby displaying the home screen in the display region 11.

The operation button 17 is a history button, for example. The history button is an operation button to display a history of an application performed by the electronic apparatus 1 in the display region 11. The user operates the operation button 17, thereby displaying the history of the application performed by the electronic apparatus 1 in the display region 11.

An end in a side of the receiver hole 12 and an end in a side of the speaker hole 13 in the electronic apparatus 1 in the longitudinal direction DR1 are hereinafter referred to as "a first end 10a" and "a second end 10b", respectively. A right end and left end in the electronic apparatus 1 in the short-length direction DR2 in a state where the electronic apparatus 1, which is disposed with its first end 10a located upper side, is viewed from a side of the display region 11 are hereinafter referred to as "a third end 10c" and "a fourth end 10d", respectively.

<Electrical Configuration of Electronic Apparatus>

Figure 3:
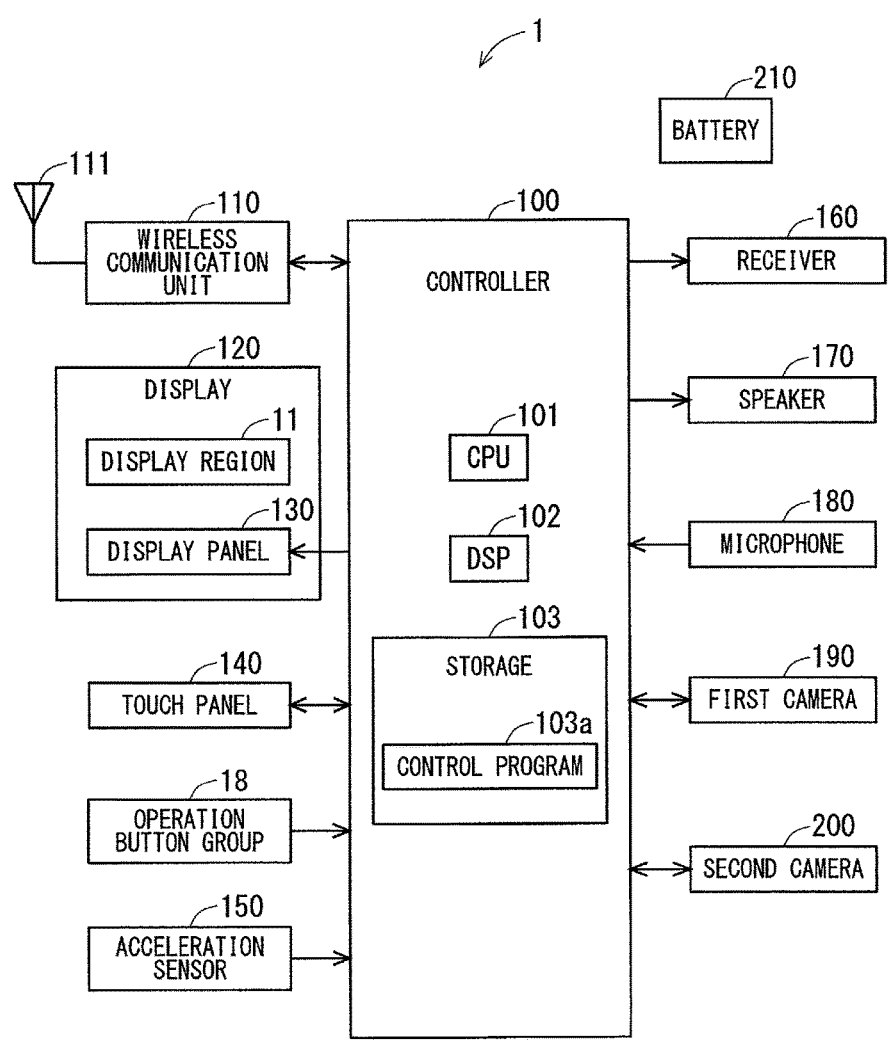
FIG. 3 illustrates an example of a configuration of the electronic apparatus.

FIG. 3 illustrates a block diagram mainly showing an example of an electrical configuration of the electronic apparatus 1. As shown in FIG. 3, the electronic apparatus 1 includes a controller 100, a wireless communication unit 110, a display 120, the touch panel 140, the operation button group 18, and an acceleration sensor 150. The electronic apparatus 1 further includes a receiver 160, a speaker 170, a microphone 180, the first camera 190, the second camera 200, and a battery 210. The apparatus case 2 houses these components provided in the electronic apparatus 1.

The controller 100 controls other components of the electronic apparatus 1 to collectively manage the operation of the electronic apparatus 1. The controller 100 can also be referred to as a control device. The controller 100 includes at least one processor for providing control and processing capability to perform various functions as described in detail below.

In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In the present example, the controller 100 includes a CPU (Central Processing Unit) 101, a DSP (Digital Signal Processor) 102, and a storage 103. The storage 103 includes a non-transitory recording medium readable by the CPU 101 and the DSP 102 such as a ROM (Read Only Memory) or a RAM (Random Access Memory). The ROM of the storage 103 is, for example, a flash ROM (flash memory) that is a non-volatile memory. The storage 103 can store, for example, a plurality of control programs 103a for controlling the electronic apparatus 1. The CPU 101 and the DSP 102 execute the various control programs 103a stored in the storage 103 to achieve various functions of the controller 100.

All or a part of the functions of the controller 100 may be achieved by a hardware circuit which does not need a software to achieve the function of the hardware. The storage 103 may include a non-transitory computer-readable recording medium other than the ROM and the RAM. The storage 103 may include, for example, a compact hard disk drive and a SSD (Solid State Drive).

The plurality of control programs 103a in the storage 103 include various applications (application programs). The storage 103 stores, for example, a call application to perform a voice call and a video call, a browser to display a website, and a mail application to create, browse, send, and receive an e-mail. The storage 103 also stores a camera application to take a picture of an object using the first camera 190 and the second camera 200, a recorded image display application to display a still image and a video recorded in the storage 103, and a music reproduction control application to control a reproduction of a music data stored in the storage 103. The storage 103 may store at least one application in the storage 103 in advance. The electronic apparatus 1 may download the at least one application in the storage 103 from the other device and store it in the storage 103.

The wireless communication unit 110 has an antenna 111. The wireless communication unit 110 can perform a wireless communication using antenna 111 under control of the controller 100. The wireless communication unit 110 can receive, through the antenna 111, a signal from a mobile phone different from the electronic apparatus 1 or a signal from a communication device such as a web server connected to Internet, for example, via a base station. The wireless communication unit 110 can perform amplification processing and down-conversion processing on the signal received by the antenna 111 and then outputs a resultant signal to the controller 100. The controller 100 can perform demodulation processing, for example, on the received signal which has been input, to thereby obtain a user data and a control data contained in the received signal. The wireless communication unit 110 can also perform up-conversion processing and amplification processing on a transmission signal containing the user data and the control data which has been generated by the controller 100, to thereby wirelessly transmit the processed transmission signal from the antenna 111. The transmission signal from the antenna 111 is received, via the base station, by a mobile phone different from the electronic apparatus 1 or a communication device connected to the Internet, for example.

The display 120 includes the display region 11 located in the front surface 1a of the electronic apparatus 1 and a display panel 130. The display 120 can display various types of information in the display region 11. The display panel 130 is, for example, a liquid crystal display panel or an organic EL panel. The display panel 130 can display various types of information such as characters, signs, and graphics under control of the controller 100. The display panel 130 faces the display region 11 in the apparatus case 2. The display region 11 displays the information displayed in the display panel 130.

The touch panel 140 can detect an operation performed on the display region 11 with an operator such as a finger. The touch panel 140 is, for example, a projected capacitive touch panel. The touch panel 140 has a large number of detection points. Accordingly, the touch panel 140 can detect the large number of operation points (contact points) on the display region 11. The touch panel 140 is located in a rear side of the display region 11, for example. When the user performs an operation on the display region 11 with the operator such as his/her finger, the touch panel 140 can input an electrical signal corresponding to the operation to the controller 100. The controller 100 can specify, based on the electrical signal (output signal) from the touch panel 140, contents of the operation performed on the display region 11. Then, the controller 100 can perform processing in accordance with the specified operation contents.

When the user operates each operation button of the operation button group 18, the operation button can output, to the controller 100, an operation signal indicating that the operation button is operated. Accordingly, the controller 100 can determine whether or not each operation button has been operated for each operation button. The controller 100 to which the operation signal is input controls the other component, thereby causing the electronic apparatus 1 to execute the function allocated to the operated operation button.

The acceleration sensor 150 can detect an acceleration rate of the electronic apparatus 1. The acceleration sensor 150 is a three-axis acceleration sensor, for example. The acceleration sensor 150 can detect the acceleration rate of the electronic apparatus 1 in an x-axis direction, a y-axis direction, and a z-axis direction. The x-axis direction, the y-axis direction, and the z-axis direction are set in, for example, the longitudinal direction DR1, the short-length direction DR2, and the thickness direction DR3 of the electronic apparatus 1, respectively.

The microphone 180 can convert sound input from the outside of the electronic apparatus 1 into an electrical sound signal and then output the electrical sound signal to the controller 100. The sound from the outside of the electronic apparatus 1 is taken inside the electronic apparatus 1 through the microphone hole 14 to be input to the microphone 180.

The speaker 170 is, for example, a dynamic speaker. The speaker 170 can convert the electrical sound signal from the controller 100 into sound and then output the sound. The sound output from the external speaker 170 is output to the outside through the speaker hole 13. The user can hear the sound output through the speaker hole 13 in the place apart from the electronic apparatus 1.

The receiver 160 can output the received sound. The receiver 160 is, for example, a dynamic speaker. The receiver 160 can convert the electrical sound signal from the controller 100 into sound and then output the sound. The sound output from the receiver 160 is output to the outside through the receiver hole 12. The volume of the sound output through the receiver hole 12 is set to be smaller than the volume of the sound output through the speaker hole 13. The user brings the receiver hole 12 close to his/her ear, thereby being able to hear the sound output through the receiver hole 12. A vibration element such as a piezoelectric vibration element for causing a portion of the front surface of the apparatus case 2 to vibrate may be provided instead of the receiver 160. In the above case, the sound is transmitted to the user in a form of the vibration of the portion of the front surface.

The first camera 190 includes the lens 191, an image sensor, and so on. The second camera 200 includes the lens 201, an image sensor, and so on. Each of the first camera 190 and the second camera 200 can take an image of an object under control of the controller 100, generate a still image or a video of the object, and then output the still image or the video to the controller 100.

The lens 191 of the first camera 190 can be visually recognized from the front surface 1a of the electronic apparatus 1. Accordingly, the first camera 190 can take an image of an object located on a front surface 1a side (the display region 11 side) of the electronic apparatus 1. The lens 201 of the second camera 200 can be visually recognized from the rear surface 1b of the electronic apparatus 1. Accordingly, the second camera 200 can take an image of an object located on a rear surface 1b side of the electronic apparatus 1. When there is no specific need of distinguishing the first camera 190 and the second camera 200, each camera is simply referred to as "the camera."

The battery 210 can output a power source of the electronic apparatus 1. The battery 210 is, for example, a rechargeable battery. The battery 210 can supply the power source to various components such as the controller 100 and the wireless communication unit 110 included in the electronic apparatus 1.

<Functional Block in Controller>

Figure 4:
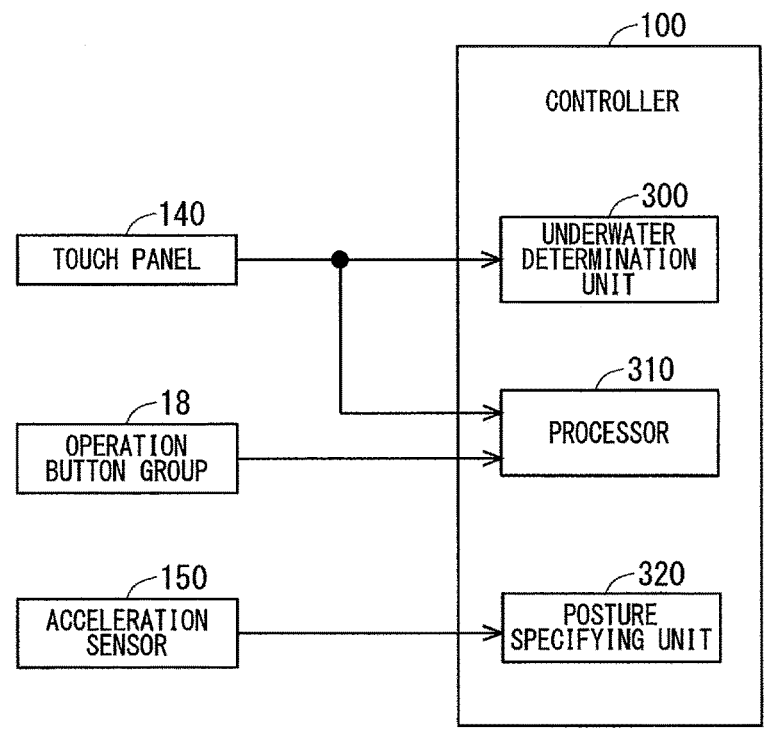
FIG. 4 illustrates an example of a configuration of a controller.

FIG. 4 illustrates a part of functional blocks formed by the CPU 101 and the DSP 102 executing the control program 103a in the storage 103. As shown in FIG. 4, the controller 100 includes an underwater determination unit 300, a processor 310, and a posture specifying unit 320 as the function blocks. At least one of the underwater determination unit 300, the processor 310, and the posture specifying unit 320 may be achieved by a hardware circuit which does not need a software to execute the function of the hardware.

The posture specifying unit 320 can specify a posture of the electronic apparatus 1 based on a detection result in the acceleration sensor 150. The posture specifying unit 320 may specify the posture of the electronic apparatus 1 based on a detection result in an angular speed sensor instead of the detection result in the acceleration sensor 150.

The underwater determination unit 300 can perform an underwater determination to determine whether or not the electronic apparatus 1 is located in water based on the output signal from the touch panel 140. The underwater determination unit 300 is deemed to be able to determine whether or not the apparatus case 2 is located in water.

When the electronic apparatus 1 is located in water, the entire surface of the display region 11 is in a state of being in contact with the water. That is to say, the entire surface of the display region 11 is in a state of being operated, and the touch panel 140 reacts. In the underwater determination, the underwater determination unit 300 obtains the number of operation points on the display region 11 based on the output signal from the touch panel 140 having the large number of detection points. Then, the underwater determination unit 300 determines that the electronic apparatus 1 is located in water when the obtained number of operation points is equal to or larger than a threshold value. In contrast, the underwater determination unit 300 determines that the electronic apparatus 1 is not located in water when the number of operation points is smaller than the threshold value. The underwater determination unit 300 may determine that the electronic apparatus 1 is located in water when the number of operation points is larger than the threshold value, and determine that the electronic apparatus 1 is not located in water when the number of operation points is equal to or smaller than the threshold value.

The case where the electronic apparatus 1 is located in water includes a case where the user causes the electronic apparatus 1 to take an image in water, for example. When the user performs a predetermined operation on the electronic apparatus 1 located in water, the first camera 190 or the second camera 200 in the electronic apparatus 1 takes an image of an object located in water. Accordingly, the electronic apparatus 1 executes the underwater shooting.

When the electronic apparatus 1 includes a pressure sensor capable of measuring a pressure of air and liquid, the underwater determination unit 300 may performs the underwater determination based on the output signal from the pressure sensor. In the above case, the water determination unit 300 obtains a pressure value based on an output signal from the pressure sensor. Then, the underwater determination unit 300 compares the obtained pressure value and a threshold value. When the pressure value is larger than the threshold value, the underwater determination unit 300 determines that the electronic apparatus 1 is located in water. In contrast, when the pressure value is equal to or smaller than the threshold value, the underwater determination unit 300 determines that the electronic apparatus 1 is not located in water. The underwater determination unit 300 may determine that the electronic apparatus 1 is located in water when the pressure value is equal to or larger than the threshold value, and determine that the electronic apparatus 1 is not located in water when the pressure value is smaller than the threshold value. The underwater determination unit 300 may perform the underwater determination based on the output signal from the pressure sensor and the output signal from the touch panel 140.

The processor 310 executes various processing in accordance with the operation performed by the user on the electronic apparatus 1. The processor 310 can specify contents of the operation performed by the user on the electronic apparatus 1. For example, the processor 310 can specify, based on the output signal from the touch panel 140, contents of the operation performed on the display region 11. The processor 310 can specify which operation button in the plurality of operation buttons is operated based on the output signal from the operation button group 18. Then, the processor 310 can perform processing in accordance with the specified operation contents.

Examples of a basic operation performed by the user on the display region 11 using the operator include a slide operation, a tap operation, and a flick operation, for example.

The slide operation refers to an operation of moving an operator such as a finger which is kept in contact with or close proximity to the display region 11. That is to say, the slide operation refers to an operation in which the operator slides over the display region 11. The processor 310 can determine whether or not the slide operation has been performed on the display region 11 based on the output signal from the touch panel 140. When the processor 310 determines that the slide operation is performed on the display region 11, the processor 310 can perform the processing in accordance with the slide operation. For example, the processor 310 controls the display 120, thereby being able to scroll a display in the display region 11 or switch a page displayed in the display region 11 to the other page.

The tap operation refers to an operation of the user taking the operator off the display region 11 right after bringing the operator into contact with or close to the display region 11. The processor 310 can determine whether or not the tap operation has been performed on the display region 11 based on the output signal from the touch panel 140. When the processor 310 determines that the tap operation has been performed on the display region 11, the processor 310 can perform the processing in accordance with the tap operation. For example, when the tap operation is performed on an application icon for executing the application displayed in the display region 11, the processor 310 can execute the application in the storage 103 corresponding to the application icon on which the tap operation has been performed.

The flick operation refers to an operation of flicking the display region 11 with the operator. The processor 310 can determine whether or not the flick operation has been performed on the display region 11 based on the output signal from the touch panel 140. In the present example, when an operation, in which a movement amount of the operation point in the display region 11 in a predetermined direction (for example, right direction) is equal to or larger than a threshold value, is operated, the processor 310 determines that the flick operation in the predetermined direction has been performed on the display region 11. When the processor 310 determines that the flick operation in the predetermined direction has been performed on the display region 11, the processor 310 can perform the processing in accordance with the flick operation in the predetermined direction. For example, the processor 310 controls the display 120, thereby being able to scroll a display in the display region 11 in a direction of the flick operation or switch a page displayed in the display region 11 to the other page. It is also applicable that when an operation, in which the movement amount of the operation point in the display region 11 in the predetermined direction is larger than the threshold value, is operated, the processor 310 determines that the flick operation in the predetermined direction has been performed on the display region 11. The threshold value used for the determination of the flick operation is referred to as "the first threshold value" hereinafter.

<Underwater Mode>

An operation mode of the electronic apparatus 1 includes an underwater mode. When the underwater determination unit 300 determines that the electronic apparatus 1 is located in water, the electronic apparatus 1 operates in the underwater mode. The underwater determination unit 300 performs the underwater determination at a time of executing a camera application, for example. A state where the underwater mode is released is referred to as "the normal mode" hereinafter.

Figure 5:
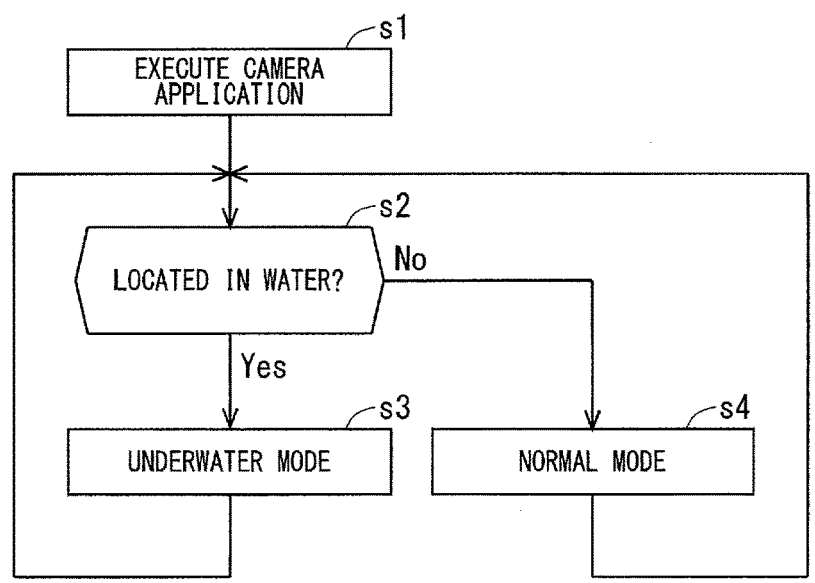
FIG. 5 illustrates a flow chart showing an example of an operation of the electronic apparatus.

FIG. 5 illustrates a flow chart showing an example of an operation of the electronic apparatus 1 at the time of executing the camera application. When the processor 310 determines that an operation for providing an instruction to execute the camera application has been performed on the display region 11, the processor 310 executes the camera application stored in the storage 103 in Step s1 as shown in FIG. 5. During the execution of the camera application, the user operates the electronic apparatus 1, thereby being able to cause the first camera 190 or the second camera 200 to take an image.

When the execution of the camera application is started, the underwater determination unit 300 performs the underwater determination in Step s2. When the underwater determination unit 300 determines that the electronic apparatus 1 is located in water in the underwater determination in Step s2, the controller 100 sets the operation mode of the electronic apparatus 1 to the underwater mode in Step s3. Subsequently, Step s2 is executed again. In the meanwhile, when the underwater determination unit 300 determines that the electronic apparatus 1 is not located in water, in the underwater determination in Step s2, the controller 100 sets the operation mode of the electronic apparatus 1 to the normal mode in Step s3. Subsequently, Step s2 is executed again. Step s2 is periodically repeated, for example, during the execution of the camera application.

In the underwater mode, the operation performed on the display region 11 is invalid. Thus, in the underwater mode, the user operates the operation button included in the operation button group 18, thereby being able to perform an input operation on the electronic apparatus 1. The user operates an operation button (hardware button) not shown other than the operation buttons 15, 16, and 17, for example, thereby being able to cause the electronic apparatus 1 to switch the camera to be used, cause the camera to take a video, cause the camera to take a still image, and cause the electronic apparatus 1 to change the various settings regarding the shooting.

Moreover, in the underwater mode, the controller 100 performs a color correction and a distortion correction appropriate to the underwater shooting, which is different from the normal mode, on the image taken by the camera. Accordingly, the electronic apparatus 1 can record an appropriate image in the storage 103 even when the electronic apparatus 1 is located in water.

The user may put the electronic apparatus 1 executing the camera application in water, or may cause the electronic apparatus 1 to execute the camera application after putting the electronic apparatus 1 in water. In the latter case, for example, the operation button is operated when the electronic apparatus 1 which is not executing the camera application is located in water, thereby the camera application is executed, and the operation mode of the electronic apparatus 1 is set to the underwater mode with the start of the execution of the camera application.

<Display Screen at Time of Taking Image>

During the execution of the camera application, information is displayed in the display region 11 so that the user can visually recognize the information in a correct direction (posture) even when the electronic apparatus 1 rotates around the thickness direction DR3. This point is described hereinafter.

Figure 6:
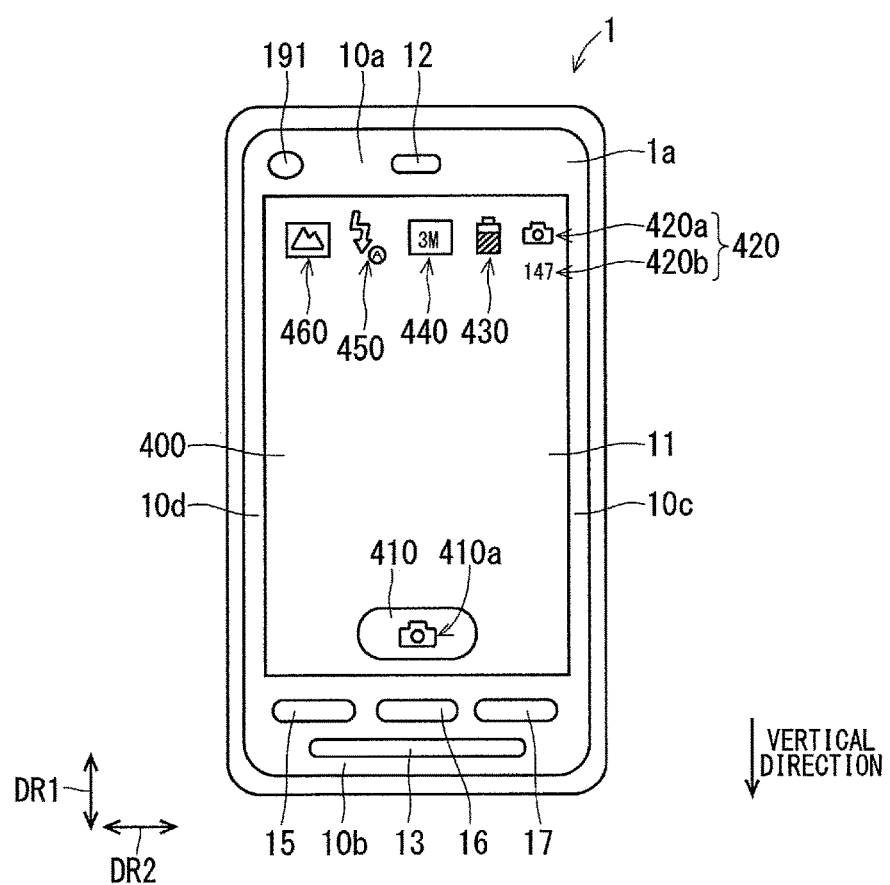
FIG. 6 illustrates an example of a display of the electronic apparatus.

FIG. 6 illustrates an example of a display screen 400 displayed in the display region 11 during the execution of the camera application. FIG. 6 illustrates an example of the display screen 400 when the camera takes a still image.

The display screen 400 shows a through image which indicates an object shot by the camera in real time (not shown) The display screen 400 shows a shutter button 410 and a plurality of icons 420, 430, 440, 450, and 460 shown in FIG. 6 overlapping the through image. The through image is referred to as a live view image in some cases.

The shutter button 410 includes a graphic 410*a* indicating a still image shooting. The icon 420 indicates a remaining number of still images which can be taken by the electronic apparatus 1. The icon 420 includes a graphic 420*a* indicating the still image shooting and a number 420*b* indicating the remaining number of still images which can be taken by the electronic apparatus 1.

The icon 430 indicates a current capacity of the battery 210. That is to say, the icon 430 indicates a remaining battery power. The icon 440 indicates a setting value of a total number of pixels of the still image taken by the camera. The icon 450 indicates a current setting regarding a flash. The icon 460 indicates a current setting of a shooting mode in accordance with a shooting scene. The information shown in display screen 400 is not limited to the example of FIG. 6.

In many cases, the user causes the camera to take an image of an object while holding the electronic apparatus 1 with its the planar display region 11 being approximately parallel to a vertical direction (gravity direction), in other words, with its front surface 1*a* being approximately parallel to the vertical direction. In the present example, even when the electronic apparatus 1 rotates around the thickness direction DR3 in a state where the display region 11 is approximately parallel to the vertical direction, the display region 11 displays the information so that the graphic 410*a* of the shutter button 410, the graphic 420*a* and the number 420*b* of the icon 420, and the icons 430, 440, 450, and 460 are visually recognized in the correct direction. Each of the graphic 410*a*, the graphic 420*a*, the number 420*b*, and the icons 430, 440, 450, and 460 is referred to as "an object information" hereinafter in some cases.

FIG. 6 illustrates the electronic apparatus 1 held by the user so that the display region 11 is approximately parallel to the vertical direction and the first end 10a of the electronic apparatus 1 in the longitudinal direction DR1 is directed upward. A posture of the electronic apparatus 1 shown in FIG. 6 is referred to as "a first posture" hereinafter.

FIG. 7 illustrates the electronic apparatus 1 rotated clockwise 90 degrees around the thickness direction DR3 from the first posture viewed from the display region 11 side. A posture of the electronic apparatus 1 shown in FIG. 7 is referred to as "a second posture" hereinafter.

Figure 8:
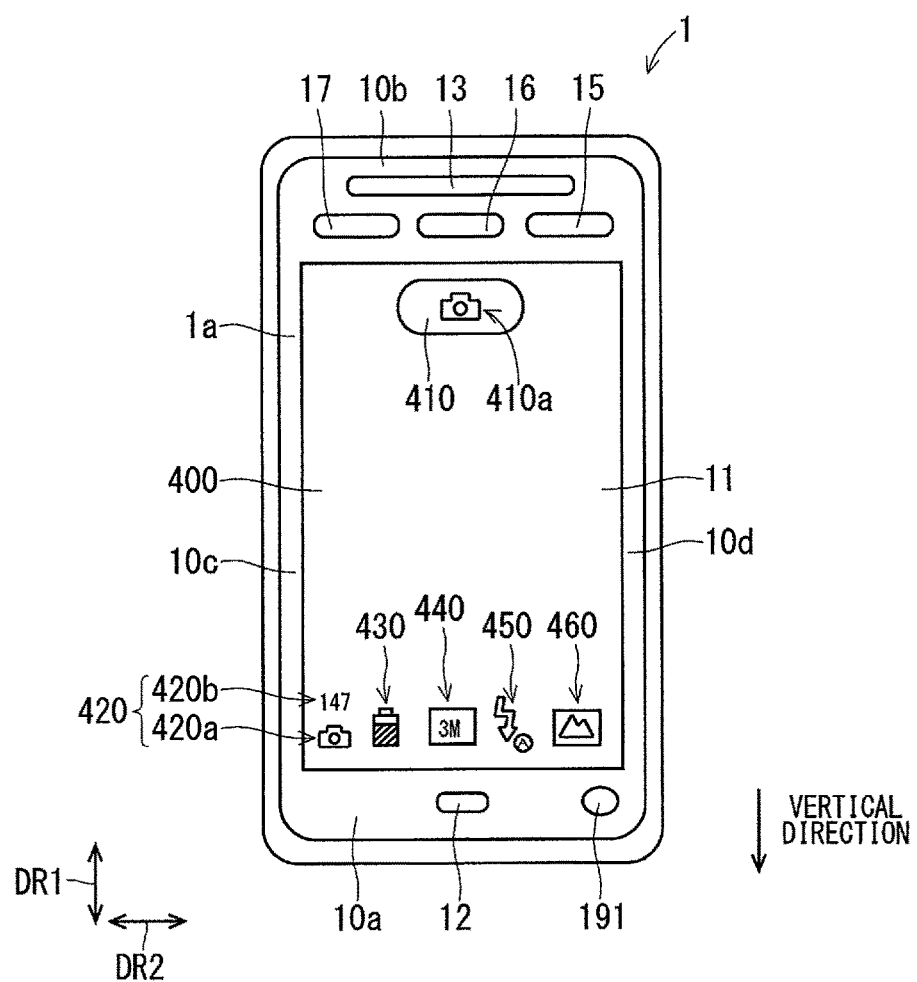
FIG. 8 illustrates an example of a display of the electronic apparatus.

FIG. 8 illustrates the electronic apparatus 1 rotated clockwise 180 degrees around the thickness direction DR3 from the first posture viewed from the display region 11 side. A posture of the electronic apparatus 1 shown in FIG. 8 is referred to as "a third posture" hereinafter.

FIG. 9 illustrates the electronic apparatus 1 rotated clockwise 270 degrees around the thickness direction DR3 from the first posture viewed from the display region 11 side. A posture of the electronic apparatus 1 shown in FIG. 9 is referred to as "a fourth posture" hereinafter.

A clockwise rotation and a counterclockwise rotation in a case where the electronic apparatus 1 is viewed from the display region 11 side are simply referred to as "clockwise rotation" and "counterclockwise rotation", respectively. Moreover, a rotation of the electronic apparatus 1 simply means a rotation of the electronic apparatus 1 around the thickness direction DR3.

When the posture of the electronic apparatus 1 changes from the first posture to the second posture, a relative posture of each object information with respect to the display region 11 rotates counterclockwise 90 degrees to cancel the rotation of the electronic apparatus 1 (refer to FIG. 6 and FIG. 7). Accordingly, even when the posture of the electronic apparatus 1 changes from the first posture to the second posture, the user visually recognizes each of the graphic 410a, the graphic 420a, the number 420b, and the icons 430, 440, 450, and 460 in the correct direction.

Similarly, when the posture of the electronic apparatus 1 changes from the first posture to the third posture, a relative posture of each object information with respect to the display region 11 rotates counterclockwise 180 degrees (refer to FIG. 6 and FIG. 8). Moreover, when the posture of the electronic apparatus 1 changes from the first posture to the fourth posture, a relative posture of each object information with respect to the display region 11 rotates counterclockwise 270 degrees (refer to FIG. 6 and FIG. 9).

As described above, when the posture of the electronic apparatus 1 is any of the first posture, the second posture, the third posture, and the fourth posture, the display region 11 displays each of the graphic 410a, the graphic 420a, the number 420b, and the icons 430, 440, 450, and 460 to be visually recognized in the correct direction. Accordingly, the user can easily understand contents which the information displayed in the display region 11 means regardless of the posture of the electronic apparatus 1.

Herein, a rotational angle of the electronic apparatus 1 with respect to the first posture is defined as a rotational angle of the electronic apparatus 1 on a basis of the first posture. A clockwise rotational angle of the electronic apparatus 1 is represented by +, and a counterclockwise rotational angle of the electronic apparatus 1 is represented by −. In the above case, the electronic apparatus 1 in the first posture is deemed to be the electronic apparatus 1 having the rotational angle of 0 degree. The electronic apparatus 1 in the second posture is deemed to be the electronic apparatus 1 having the rotational angle of +90 degrees, for example. The electronic apparatus 1 in the third posture is deemed to be the electronic apparatus 1 having the rotational angle of +180 degrees, for example. The electronic apparatus 1 in the fourth posture is deemed to be the electronic apparatus 1 having the rotational angle of −90 degrees, for example.

When the rotational angle of the electronic apparatus 1 is larger than −45 degrees and equal to or smaller than +45 degrees, the relative posture of each object information with respect to the display region 11 is the same as that of the electronic apparatus 1 in the first posture. That is to say, when the rotational angle of the electronic apparatus 1 is larger than −45 degrees and equal to or smaller than +45 degrees, each object information is displayed in such a manner that it is visually recognized in the correct direction in a state where the electronic apparatus 1 is in a posture that the first end 10a is located on the upper side and the longitudinal direction DR1 approximately extends along the vertical direction. The electronic apparatus 1 having the rotational angle larger than −45 degrees and equal to or smaller than +45 degrees is the same as the electronic apparatus 1 in the first posture which is simply rotated, as shown in FIG. 10. FIG. 10 illustrates the electronic apparatus 1 having the rotational angle of approximately +30 degrees.

When the rotational angle of the electronic apparatus 1 is larger than +45 degrees and equal to or smaller than +135 degrees, the relative posture of each object information with respect to the display region 11 is the same as that of the electronic apparatus 1 in the second posture. That is to say, when the rotational angle of the electronic apparatus 1 is larger than +45 degrees and equal to or smaller than +135 degrees, each object information is displayed in such a manner that it is visually recognized in the correct direction in a state where the electronic apparatus 1 is in a posture that the fourth end 10d is located on the upper side and the short-length direction DR2 approximately extends along the vertical direction. The electronic apparatus 1 having the rotational angle larger than +45 degrees and equal to or smaller than +135 degrees is the same as the electronic apparatus 1 in the second posture which is simply rotated.

When the rotational angle of the electronic apparatus 1 is larger than +135 degrees and equal to or smaller than +225 degrees, the relative posture of each object information with respect to the display region 11 is the same as that of the electronic apparatus 1 in the third posture. That is to say, when the rotational angle of the electronic apparatus 1 is larger than +135 degrees and equal to or smaller than +225 degrees, each object information is displayed in such a manner that it is visually recognized in the correct direction in a state where the electronic apparatus 1 is in a posture that the second end 10b is located on the upper side and the longitudinal direction DR1 approximately extends along the vertical direction. The electronic apparatus 1 having the rotational angle larger than +135 degrees and equal to or smaller than +225 degrees is the same as the electronic apparatus 1 in the third posture which is simply rotated.

When the rotational angle of the electronic apparatus 1 is larger than −135 degrees and equal to or smaller than −45 degrees, the relative posture of each object information with respect to the display region 11 is the same as that of the electronic apparatus 1 in the fourth posture. That is to say, when the rotational angle of the electronic apparatus 1 is larger than −135 degrees and equal to or smaller than −45 degrees, each object information is displayed in such a manner that it is visually recognized in the correct direction in a state where the electronic apparatus 1 is in a posture that the third end 10c is located on the upper side and the short-length direction DR2 approximately extends along the vertical direction. The electronic apparatus 1 having the rotational angle larger than −135 degrees and equal to or smaller than −45 degrees is the same as the electronic apparatus 1 in the fourth posture which is simply rotated.

As described above, in the present example, when the electronic apparatus 1 has the rotational angle other than 0 degree, +90 degrees, +180 degrees, and +270 degrees, the user visually recognizes each object information in a little inclined state. The electronic apparatus 1 having the rotational angle other than 0 degree, +90 degrees, +180 degrees, and +270 degrees is referred to as "the electronic apparatus 1 in the inclined posture" in some cases hereinafter.

The display of each object information described above is achieved when the controller 100 controls the display 120 based on the posture of the electronic apparatus 1 specified by the posture specifying unit 320.

A description of the operation of the electronic apparatus 1 described hereinafter relates to a description of the operation of the electronic apparatus 1 in which the display region 11 displays the display screen 400 as shown in FIG. 6, for example, unless otherwise noted.

<Processing at Time of Flick Operation>

When the flick operation in the predetermined direction is performed on the display region 11 displaying the display screen 400 in the electronic apparatus 1, the processing in accordance with the flick operation in the predetermined direction is executed. In the present example, the processing is allocated to the flick operations in the left direction and the right direction, however, no processing is allocated to the flick operations in the upper direction and the lower direction. A processing of displaying a setting menu for performing various settings regarding the camera shooting, for example, is allocated to the flick operation in the left direction. A processing of displaying an image taken by the camera and then recorded in the storage 103, for example, is allocated to the flick operation in the right direction. When there is no specific need of distinguishing the flick operations in the left direction and the right direction, each flick operation is referred to as "the flick operation in the right and left direction" in some cases hereinafter.

Figure 11:
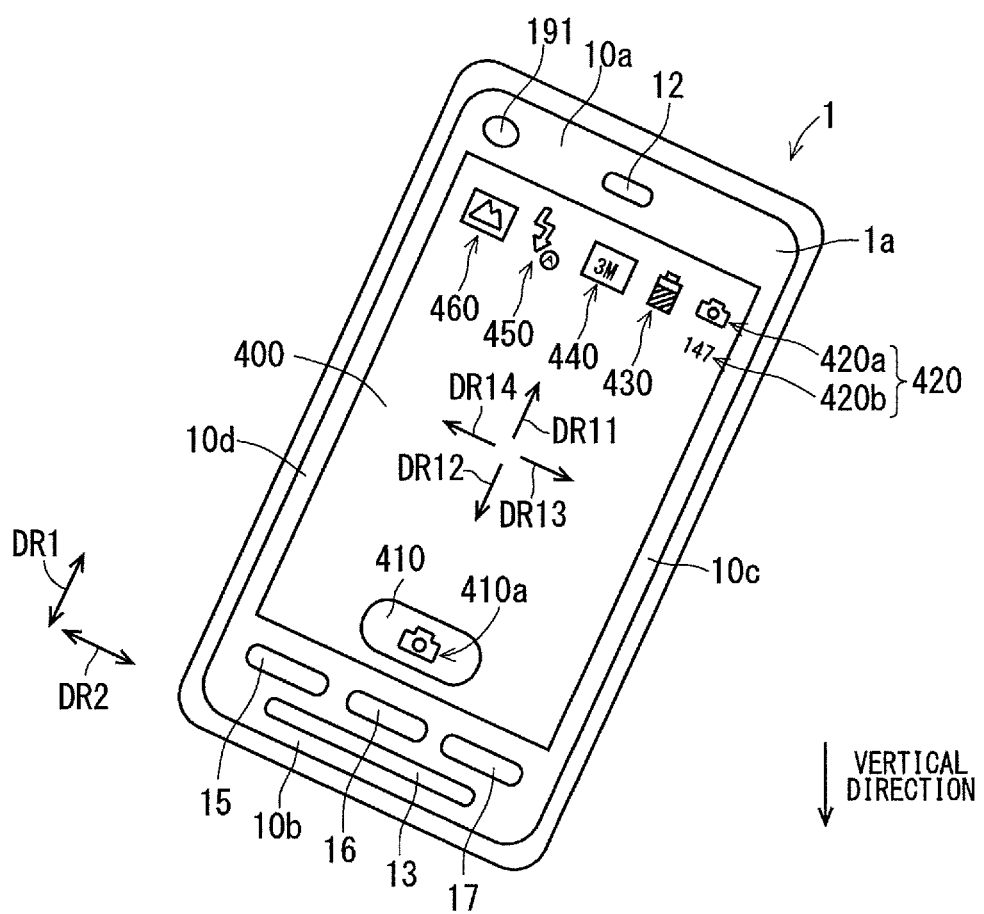
FIG. 11 illustrates a diagram for describing a direction regarding an operation.

Herein, when the rotational angle of the electronic apparatus 1 is larger than −45 degrees and equal to or smaller than +45 degrees, the upper direction regarding the operation is a direction from the second end 10b side toward the first end 10a side along the longitudinal direction DR1. In the similar case, the lower direction regarding the operation is a direction from the first end 10a side toward the second end 10b side along the longitudinal direction DR1. In the similar case, the right direction regarding the operation is a direction from the fourth end 10d side toward the third end 10c side along the short-length direction DR2. In the similar case, the left direction regarding the operation is a direction from the third end 10c side toward the fourth end 10d side along the short-length direction DR2. An upper direction DR11, a lower direction DR12, a right direction DR13, and the left direction DR14 regarding the operation performed on the electronic apparatus 1 in the posture shown in FIG. 10 are as illustrated in FIG. 11.

When the rotational angle of the electronic apparatus 1 is larger than +45 degrees and equal to or smaller than +135 degrees, the upper direction regarding the operation is a direction from the third end 10c side toward the fourth end 10d side along the short-length direction DR2. In the similar case, the lower direction regarding the operation is a direction from the fourth end 10d side toward the third end 10c side along the short-length direction DR2. In the similar case, the right direction regarding the operation is a direction from the second end 10b side toward the first end 10a side along the longitudinal direction DR1. In the similar case, the left direction regarding the operation is a direction from the first end 10a side toward the second end 10b side along the longitudinal direction DR1.

When the rotational angle of the electronic apparatus 1 is larger than +135 degrees and equal to or smaller than +225 degrees, the upper direction regarding the operation is a direction from the first end 10a side toward the second end 10b side along the longitudinal direction DR1. In the similar case, the lower direction regarding the operation is a direction from the second end 10b side toward the first end 10a side along the longitudinal direction DR1. In the similar case, the right direction regarding the operation is a direction from the third end 10c side toward the fourth end 10d side along the short-length direction DR2. In the similar case, the left direction regarding the operation is a direction from the fourth end 10d side toward the third end 10c side along the short-length direction DR2.

When the rotational angle of the electronic apparatus 1 is larger than −135 degrees and equal to or smaller than −45 degrees, the upper direction regarding the operation is a direction from the fourth end 10d side toward the third end 10c side along the short-length direction DR2. In the similar case, the lower direction regarding the operation is a direction from the third end 10c side toward the fourth end 10d side along the short-length direction DR2. In the similar case, the right direction regarding the operation is a direction from the first end 10a side toward the second end 10b side along the longitudinal direction DR1. In the similar case, the left direction regarding the operation is a direction from the second end 10b side toward the first end 10a side along the longitudinal direction DR1.

The direction such as the upper direction and the lower direction, for example, is the direction regarding the operation defined as described above.

When the touch panel 140 starts the detection of the operation point on the display region 11 in a state where the display region 11 displays the display screen 400, the processor 310 starts tracking the movement of the operation point on the display region 11 based on the output signal of the touch panel 140. The processor 310 tracks the movement of the operation point on an XY plane in which one and the other directions of the upper and lower direction and the right and left direction are defined as an X direction and a Y direction, respectively. When the processor 310 starts tracking the movement of the operation point, it performs a right-left flick determination to determine whether or not the flick operation in the left direction has performed and whether or not the flick operation in the right direction has been performed. In the present example, the processing is not allocated to the flick operation in the upper direction and the lower direction, so that the processor 310 does not determine whether or not the flick operation in the upper direction has performed and whether or not the flick operation in the lower direction has been performed.

In the right-left flick determination, the processor 310 continually obtains the movement amount of the operation point on which the tracking of the movement is performed in the left direction and the right direction. Then, the processor 310 determines that the flick operation has been performed in a direction in which the movement amount reaches the first threshold value earlier in the movement amounts of the operation point in the left direction and the right direction. That is to say, when the movement amount of the operation point in the left direction reaches the first threshold value earlier than the movement amount of the operation point in the right direction, the processor 310 determines that the flick operation in the left direction, that is to say, the operation in which the movement amount of the operation point in the left direction is equal to or larger than the first threshold value has been performed on the display region 11. In the meanwhile, when the movement amount in the right direction reaches the first threshold value earlier than the movement amount in the left direction, the processor 310 determines that the flick operation in the right direction, that is to say, the operation in which the movement amount of the operation point in the right direction is equal to or larger than the first threshold value has been performed on the display region 11.

The processor 310 can simultaneously track the movements of the M operation points at a maximum, for example. M is an integral number equal to or larger than 2, and M=5, for example. When the processor 310 simultaneously tracks the movements of the plurality of operation points, the processor 310 determines that the flick operation in the left direction has been performed when the movement amount of any one of the plurality of operation points in the left direction reaches the first threshold value earlier than the movement amount of that one in the right direction. In the meanwhile, the processor 310 determines that the flick operation in the right direction has been performed when the movement amount of any one of the plurality of operation points in the right direction reaches the first threshold value earlier than the movement amount of that one in the left direction.

When the processor 310 determines that the flick operation in the left direction has been performed on the display region 11 displaying the display screen 400, the processor 310 causes the display 120 to display the setting menu. In the meanwhile, when the processor 310 determines that the flick operation in the right direction has been performed on the display region 11 displaying the display screen 400, the processor 310 executes the recorded image display application stored in the storage 103, thereby causing the display 120 to display an image which has been taken by the camera and stored in the storage 103. At this time, the display 120 displays a latest image taken by the camera.

A processing other than the processing of displaying the setting menu may also be allocated to the flick operation in the left direction. A processing other than the processing of displaying the image which has been taken by the camera and stored in the storage 103 may also be allocated to the flick operation in the right direction.

<Flick Invalidation Determination>

Figure 12:
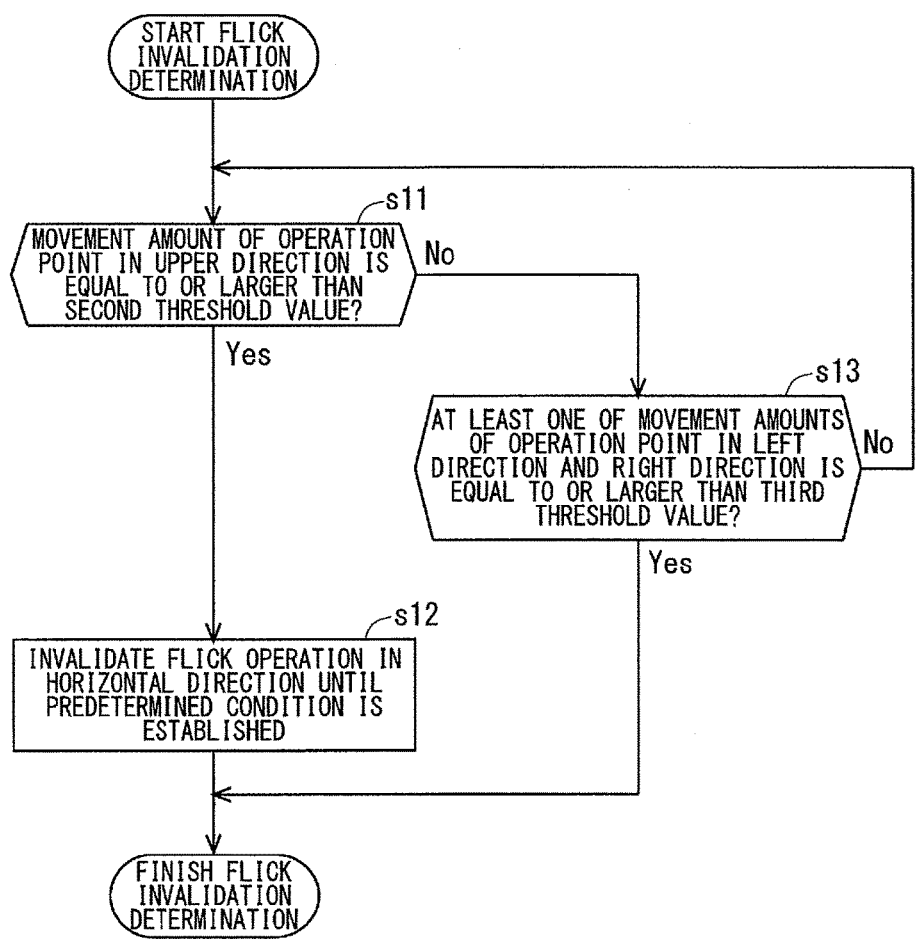
FIG. 12 illustrates a flow chart showing an example of an operation of the electronic apparatus.

When the processor 310 starts tracking the movement of the operation point, it performs not only the right-left flick determination but also a flick invalidation determination to determine whether or not the flick operation in the right and left direction is caused to be invalid. The processor 310 performs the right-left flick determination and the flick invalidation determination in parallel. FIG. 12 illustrates a flow chart showing an example of the flick invalidation determination.

When the processor 310 starts tracking the movement of the operation point, it starts the right-left flick determination, and also starts the flick invalidation determination. In the flick invalidation determination, as shown in FIG. 12, the processor 310 performs an upper direction determination to determine whether or not the movement amount of the operation point, on which the tracking of the movement is performed, in the upper direction at the current time is equal to or larger than the second threshold value in Step s11. When the processor 310 simultaneously tracks the movements of the plurality of operation points, the processor 310 performs the upper direction determination on each of the plurality of operation points. A determination whether or not the movement amount of the operation point in the upper direction is larger may also be performed in the upper direction determination.

When it is determined that the movement amount of the operation point in the upper direction is equal to or larger than the second threshold value in Step s11 (Yes), the processor 310 invalidates the flick operation in the right and left direction until a predetermined condition is established in Step s12. That is to say, even when the processor 310 determines that the flick operation in the left direction has been performed in the right-left flick determination, it does not perform the processing in accordance with the flick operation in the left direction, and even when the processor 310 determines that the flick operation in the right direction has been performed, it does not perform the processing in accordance with the flick operation in the right direction, until the predetermined condition is established. In a state where the upper direction determination is performed on the plurality of operation points in Step s11, when the processor 310 determines that the movement amount of any of the operation points in the upper direction is equal to or larger than the second threshold value in the upper direction determination performed on the plurality of operation points, the processor 310 invalidates the flick operation in the right and left direction until the predetermined condition is established.

Adopted as the predetermined condition in Step s12 is that, for example, the touch panel 140 detects no operation point. In the above case, when the processor 310 determines that the movement amount of the operation point in the upper direction DR11 is equal to or larger than the second threshold value, the processor 310 invalidates the flick operation in the right and left direction until the touch panel 140 detects no operation point. When the processor 310 determines that the movement amount of the operation point in the upper direction is equal to or larger than the second threshold value, the processor 310 may finish the right-left flick determination which has been executed, thereby invalidating the flick operation in the right and left direction.

When it is determined that the movement amount of the operation point in the upper direction at the current time is smaller than the second threshold value in Step s11 (No), the processor 310 performs a right and left direction determination to determine whether or not at least one of the movement amounts of the operation point in the left direction and the right direction at the current time is equal to or larger than the third threshold value in Step s13. When the processor 310 simultaneously tracks the movements of the plurality of operation points, the processor 310 performs the right and left direction determination on each of the plurality of operation points in a case where the movement amounts of the plurality of operation points in the upper direction are respectively smaller than the second threshold value. A determination whether or not at least one of the movement amounts of the operation point in the left direction and the right direction is larger than the third threshold value may also be performed in the right and left direction determination.

When it is determined in Step s13 that at least one of the movement amounts of the operation point in the left direction and the right direction is equal to or larger than the third threshold value (Yes), the flick invalidation processing is finished. Accordingly, the flick operation in the right and left direction is not invalidated even when the movement amount of the operation point in the upper direction reaches the second threshold value afterward. Thus, when it is determined that the flick operation in the left direction is performed in the right-left flick determination which is executed after the processor 310 determines the determination result to be Yes in Step s13, the processing in accordance with the flick operation is executed, and when it is determined that the flick operation in the right direction is performed, the processing in accordance with the flick operation is executed. The third threshold value used in the right and left direction determination is set to be smaller than the first threshold value used in the right-left flick determination.

In the meanwhile, when it is determined that both the movement amounts of the operation point in the left direction and the right direction are smaller than the third threshold value in Step s13 (No), the processor 310 executes Step s11 again. The processor 310 operates in the similar manner subsequently. Step s11 and Step s13 are executed repeatedly until the processor 310 determines the determination result to be Yes in any of Steps 11 and Step s13.

In a state where the right-left direction determination is performed on the plurality of operation points in Step s13, when the processor 310 determines that at least one of the movement amounts of the operation point in the left direction and the right direction is equal to or larger than the third threshold value in the right and left direction determination performed on the plurality of operation points, the processor 310 finishes the flick invalidation determination. In the meanwhile, when it is determined that both the movement amounts of the operation point in the left direction and the right direction are smaller than the third threshold value in the right and left direction determination performed on all of the plurality of operation points, the processor 310 executes Step s11 again.

As understood from the above description, the processor 310 invalidates the flick operation in the right and left direction when the state where the movement amount of the operation point in the upper direction reaches the first threshold value occurs earlier than the state where at least one of the movement amounts of the operation point in the left direction and the right direction reaches the second threshold value. In the meanwhile, the processor 310 does not invalidate the flick operation in the right and left direction when the state where at least one of the movement amounts of the operation point in the left direction and the right direction reaches the second threshold value occurs earlier than the state where the movement amount of the operation point in the upper direction reaches the first threshold value.

The processor 310 operating as described above suppresses an occurrence of an erroneous determination that the flick operation in the right and left direction has been performed in a process of putting the electronic apparatus 1 in water. This point is described hereinafter.

Figure 13:
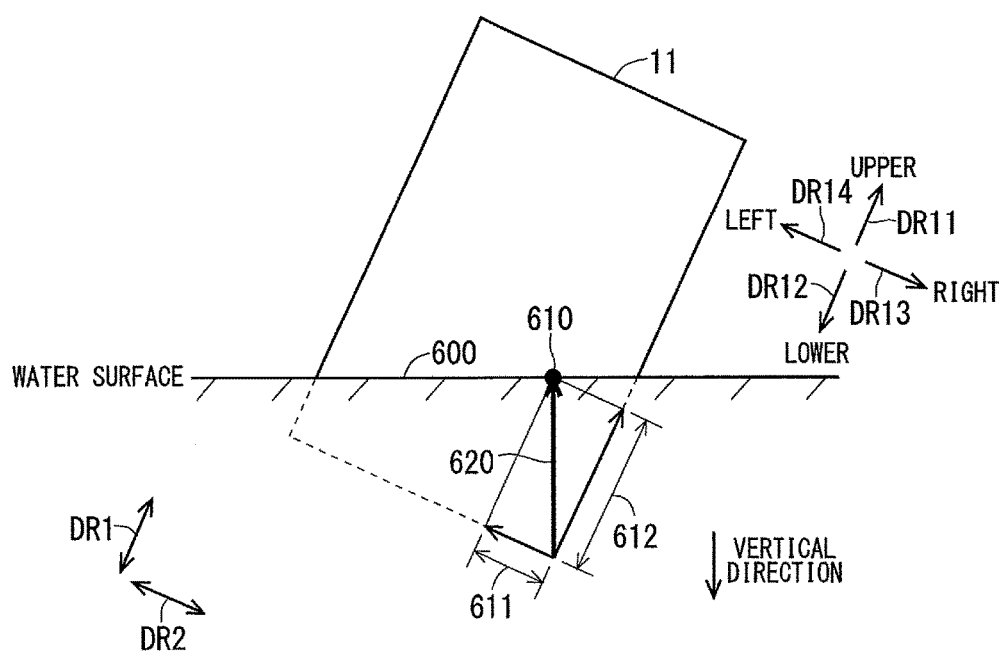
FIG. 13 illustrates an example of an appearance of a display region of the electronic apparatus which is being put in water.
Figure 14:
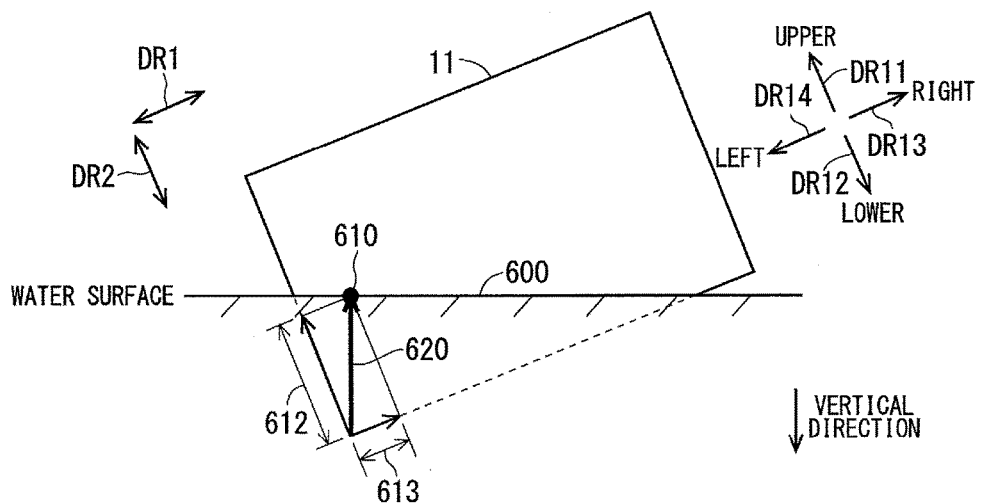
FIG. 14 illustrates an example of an appearance of a display region of the electronic apparatus which is being put in water.

Each of FIGS. 13 and 14 illustrates an example of an appearance of the display region 11 at a time of putting the electronic apparatus 1 in the inclined posture in water. FIG. 13 illustrates an appearance of the display region 11 at the time of putting the electronic apparatus 1 having the rotational angle larger than 0 degree and smaller than +45 degrees in water. FIG. 14 illustrates an appearance of the display region 11 at the time of putting the electronic apparatus 1 having the rotational angle larger than +45 degrees and smaller than +90 degrees in water.

Since the water comes in contact with the display region 11 at the time of putting the electronic apparatus 1 in water, the touch panel 140 detects a larger number of operation points. Thus, the processor 310 simultaneously tracks the movements of the M operation points in the display region 11. When the electronic apparatus 1 in the inclined posture is put in water as shown in FIGS. 13 and 14, the M operation points processed in the processor 310 move along substantially the same direction in accordance with a relative positional change of a boundary line 600 between the display region 11 and a water surface with respect to the display region 11. Each of FIGS. 13 and 14 illustrates an appearance of a movement of one operation point 610 in M operation points 610 processed in the processor 310.

When the electronic apparatus 1 in the inclined posture is put in water, that is to say, when the electronic apparatus 1 is put in water along an oblique direction with respect to the upper and lower direction and the right and left direction in a state where the display region 11 is approximately parallel to the vertical direction (simply referred to as "the oblique direction" hereinafter), each operation point 610 processed in the processor 310 moves along an oblique direction 620 as shown in FIGS. 13 and 14. Thus, there is a possibility that the movement amount of the operation point 610 in the left direction or the right direction becomes equal to or larger than the first threshold value in the process of putting the electronic apparatus 1 in the inclined posture in water. In the example in FIG. 13, there is a possibility that a movement amount 611 of the operation point 610 in the left direction becomes equal to or larger than the first threshold value in the process of putting the electronic apparatus 1 in water. In the example in FIG. 14, there is a possibility that a movement amount 613 of the operation point 610 in the right direction becomes equal to or larger than the first threshold value in the process of putting the electronic apparatus 1 in water. Accordingly, when the flick invalidation determination described above is not performed, there is a possibility that the processor 310 erroneously determines that the flick operation in the left direction or the right direction is performed in the process of putting the electronic apparatus 1 in the inclined posture in water. As a result, there is a possibility that the processor 310 executes the processing in accordance with the flick operation even though the user does not perform the flick operation. That is to say, there is a possibility that the electronic apparatus 1 executes a process which is not desired by the user in the process of putting the electronic apparatus 1 in water.

Moreover, there is a possibility that the operation point 610 moves along the oblique direction 620 due to a wave of water surface in the process of putting the electronic apparatus 1 in any one of the first to fourth posture in water. Accordingly, when the flick invalidation determination is not performed, there is a possibility that the electronic apparatus 1 executes a process which is not desired by the user in the process of putting the electronic apparatus 1 in any one of the first to fourth posture in water.

In the present example, the processor 310 determines whether or not a movement amount 612 of the operation point 610 in the upper direction (refer to FIGS. 13 and 14) is equal to or larger than the second threshold value in the flick invalidation determination. When the movement amount 612 of the operation point 610 in the upper direction is equal to or larger than the second threshold value, the processor 310 invalidates the flick operation in the right and left direction. Accordingly, the processor 310 can invalidate the flick operation in the right and left direction when the movement amount 612 of the operation point 610 in the upper direction reaches the second threshold value before it is determined that the flick operation is performed in the right-left flick determination. Thus, even when the operation point 610 moves along the oblique direction 620 in the process of putting the electronic apparatus 1 in water, the erroneous determination executed by the processor 310 that the flick operation in the right and left direction has been performed is suppressed. As a result, the processing which is not desired by the user is suppressed in the electronic apparatus 1.

The second threshold value used in the upper direction determination is set so that the movement amount 612 of the operation point 610 in the upper direction easily reaches the second threshold value before it is determined that the flick operation is performed in the right-left flick determination, in the process of putting the electronic apparatus 1 in water.

In the present example, the second threshold value is set to be smaller than the third threshold value, which is smaller than the first threshold value, for example. Accordingly, the movement amount of the operation point 610 in the upper direction easily reaches the second threshold value before the movement amount of the operation point 610 in the left direction and the right direction reaches the first threshold value in the process of putting the electronic apparatus 1 in water. Thus, there is a high possibility that the movement amount 612 of the operation point 610 in the upper direction reaches the second threshold value before the processor 310 determines that the flick operation has been performed in the right-left flick determination in the process of putting the electronic apparatus 1 in water. Thus, the flick operation in the right and left direction can be invalidated before it is determined that the flick operation has been performed in the right-left flick determination. As a result, the erroneous determination that the flick operation in the right and left direction has been performed is suppressed in the process of putting the electronic apparatus 1 in water. The first to third threshold values are appropriately set based on an experiment, for example.

Moreover, in the present example, the flick operation in the right and left direction is not invalidated when the movement amount of the operation point in the upper direction reaches the second threshold value after at least one of the movement amounts of the operation point in the left direction and the right direction reaches the third threshold value. Accordingly, even when the user erroneously performs the flick operation in a little oblique direction with respect to the right and left direction instead of the flick operation in the right and left direction, the processor 310 can determine that the flick operation in the right and left direction has been performed. Thus, operability of the electronic apparatus 1 is enhanced. This point is described hereinafter.

When the user erroneously performs the flick operation in an oblique direction toward slightly the upper side with respect to the right and left direction instead of the flick operation in the right and left direction, there is a possibility the movement amount of the operation point in the upper direction reaches the second threshold value before the movement amount of the operation point in the right and left direction reaches the first threshold value, although the movement of the operation point in the right and left direction is faster than that of the operation point in the upper direction. In such a case, differing from the present example, when Step s13 is not executed, there is a possibility that the flick operation in the right and left direction is invalidated before the movement amount of the operation point in the right and left direction reaches the first threshold value, that is to say, before it is determined that the flick operation in the right and left direction has been performed. Thus, when the user erroneously performs the flick operation in the oblique direction toward slightly the upper side with respect to the right and left direction, there is a possibility that the processor 310 cannot determine that the flick operation in the right and left direction has been performed.

In the meanwhile, in the present example, the flick operation in the right and left direction is not invalidated when the movement amount of the operation point in the upper direction reaches the second threshold value after at least one of the movement amounts of the operation point in the left direction and the right direction reaches the third threshold value. Accordingly, even when the user erroneously performs the flick operation in the oblique direction toward slightly the upper side with respect to the right and left direction, the flick operation in the right and left direction is not invalidated before it is determined that the flick operation of the right and left direction is performed as long as at least one of the movement amounts of the operation point in the left direction and the right direction reaches the third threshold value before the movement amount of the operation point in the upper direction reaches the second threshold value. Thus, when the user erroneously performs the flick operation in the oblique direction toward slightly the upper side with respect to the right and left direction, the processor 310 can determine that the flick operation in the right and left direction has been performed. As a result, operability of the electronic apparatus 1 is enhanced.

When it is erroneously determined that the flick operation in the right direction has been performed in the process of putting the electronic apparatus 1 in water, the recorded image display application is erroneously executed. When the underwater determination is not performed during the execution of the recorded image display application in such a state, the operation mode of the electronic apparatus 1 is not set to the underwater mode even when the electronic apparatus 1 is put in water. The present example can reduce the possibility of the erroneous determination that the flick operation in the right direction has been performed in the process of putting the electronic apparatus 1 in water. Accordingly, suppressed is an occurrence of the state that the operation mode of the electronic apparatus 1 being put in water is not set to the underwater mode even when the underwater determination is not performed during the execution of the recorded image display application.

Although the processing is allocated to both the flick operations in the left direction and the right direction in the example described above, the processing may also be allocated to either one of the flick operations in the left direction and the right direction. In the above case, it is determined whether or not the movement amount only in the direction to which the processing is allocated is equal to or larger than the third threshold value in Step s13. It is also applicable to allocate the processing to the flick operation in the lower direction and allocate the processing to the flick operation in the oblique direction.

A timing at which the flick invalidation determination is executed is not limited to the case where display region 11 displays the display screen 400. For example, the flick invalidation determination may be executed when the display region 11 displays the home screen. The flick invalidation determination may also be executed when the application other than the camera application is executed.

Although in the example described above, the electronic apparatus 1 is a mobile phone such as a smartphone, the other type of electronic apparatus may also be applicable. The electronic apparatus 1 may be a tablet terminal, a personal computer, a wearable apparatus, for example. The wearable apparatus adopted as the electronic apparatus 1 may be a type of attaching to an arm such as a wristband or a watch, a type of attaching to a head such as a headband or glasses, or a type of attaching to a body such as a cloth.

As described above, the electronic apparatus 1 has been shown and described in detail, the foregoing description is in all aspects illustrative and not restrictive. The various changes described above are applicable in combination as long as they are consistent with each other. It is understood that numerous changes which have not been exemplified can be devised without departing from the scope of the present disclosure.

What is claimed is:

1. An electronic apparatus, comprising:
   a touch panel configured to detect an operation performed on a surface of the electronic apparatus; and
   at least one processor configured to determine whether or not a first operation, in which a first movement amount of an operation point on said surface in a first direction is equal to or larger than a first threshold value, has been performed based on an output signal from said touch panel, and execute a processing in accordance with said first operation when said at least one processor determines that said first operation has been performed, wherein
   said at least one processor invalidates said first operation when a second movement amount of said operation point in a second direction, which is different from said first direction, becomes equal to or larger than a second threshold value before determining that said first operation has been performed, wherein the second movement amount of said operation point being equal to or larger than the second threshold value indicates that the electronic apparatus is being placed in water.

2. The electronic apparatus according to claim 1, wherein said at least one processor releases an invalidation of said first operation when said operation point is not detected by said touch panel in a state where said first operation is invalidated.

3. The electronic apparatus according to claim 1, wherein said at least one processor does not invalidate said first operation when said second movement amount of said operation point becomes equal to or larger than said second threshold value after said first movement amount of said operation point becomes equal to or larger a third threshold value before said at least one processor determines that said first operation has been performed.

4. A controller for controlling an operation of an electronic apparatus, the electronic apparatus including a touch panel configured to detect an operation performed on a surface of the electronic apparatus, the controller comprising
   at least one processor configured to determine whether or not a first operation, in which a first movement amount of an operation point on said surface in a first direction is equal to or larger than a first threshold value, has been performed based on an output signal from said touch panel, and execute a processing in accordance with said first operation when said at least one processor determines that said first operation has been performed, wherein
   said at least one processor invalidates said first operation when a second movement amount of said operation point in a second direction, which is different from said first direction, becomes equal to or larger than a second threshold value before determining that said first operation has been performed, wherein the second movement amount of said operation point being equal to or larger than the second threshold value indicates that the electronic apparatus is being placed in water.

5. A non-transitory computer-readable recording medium that stores a control program for controlling an electronic apparatus, the electronic apparatus including a touch panel configured to detect an operation performed on a surface of the electronic apparatus, the control program causing the electronic apparatus to execute:
   determining whether or not a first operation, in which a first movement amount of an operation point on said surface in a first direction is equal to or larger than a first threshold value, has been performed based on an output signal from said touch panel, and executing a processing in accordance with said first operation when determining that said first operation has been performed; and
   invalidating said first operation when a second movement amount of said operation point in a second direction, which is different from said first direction, becomes equal to or larger than a second threshold value before determining that said first operation has been performed, wherein the second movement amount of said operation point being equal to or larger than the second threshold value indicates that the electronic apparatus is being placed in water.

6. A method of operating an electronic apparatus that includes a touch panel configured to detect an operation performed on a surface of the electronic apparatus, comprising:
   determining whether or not a first operation, in which a first movement amount of an operation point on said surface in a first direction is equal to or larger than a first threshold value, has been performed based on an output signal from said touch panel, and executing a processing in accordance with said first operation when determining that said first operation has been performed; and
   invalidating said first operation when a second movement amount of said operation point in a second direction, which is different from said first direction, becomes equal to or larger than a second threshold value before determining that said first operation has been performed, wherein the second movement amount of said operation point being equal to or larger than the second threshold value indicates that the electronic apparatus is being placed in water.

* * * * *